(12) United States Patent
Yamamoto et al.

(10) Patent No.: US 7,936,383 B2
(45) Date of Patent: May 3, 2011

(54) IMAGING APPARATUS HAVING OPTICAL ZOOM AND ELECTRONIC ZOOM FUNCTIONS

(75) Inventors: Yasutoshi Yamamoto, Osaka (JP); Masaaki Nakayama, Osaka (JP); Shinobu Fusa, Osaka (JP); Kaoru Mokunaka, Hyogo (JP); Shougo Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 985 days.

(21) Appl. No.: 11/489,700

(22) Filed: Jul. 19, 2006

(65) Prior Publication Data

US 2007/0053068 A1    Mar. 8, 2007

(30) Foreign Application Priority Data

Jul. 19, 2005   (JP) ................................. 2005-208601

(51) Int. Cl.
*H04N 5/262*   (2006.01)
*G03B 17/00*   (2006.01)
*G02B 15/14*   (2006.01)

(52) U.S. Cl. ............... 348/240.1; 348/240.2; 348/240.3; 396/72; 396/60; 359/676

(58) Field of Classification Search .................. 348/347, 348/240.1–240.3; 359/676; 396/72, 60
See application file for complete search history.

(56) References Cited

U.S. PATENT DOCUMENTS

| | | | |
|---|---|---|---|
| 6,853,808 B1 * | 2/2005 | Yasuda et al. | 396/72 |
| 7,059,041 B2 * | 6/2006 | Behammer | 29/832 |
| 7,116,364 B2 * | 10/2006 | Battles et al. | 348/240.1 |
| 7,450,155 B2 * | 11/2008 | Nakanishi et al. | 348/208.5 |
| 2002/0028076 A1 * | 3/2002 | Okubo | 396/429 |
| 2002/0075395 A1 * | 6/2002 | Ohkawara | 348/347 |
| 2002/0097325 A1 | 7/2002 | Tanizoe et al. | |
| 2004/0174444 A1 * | 9/2004 | Ishii | 348/240.1 |
| 2005/0140990 A1 | 6/2005 | Ueno et al. | |

FOREIGN PATENT DOCUMENTS

| | | |
|---|---|---|
| JP | 7312714 A | 11/1995 |
| JP | 10-262203 A | 9/1998 |
| JP | 2000-184259 A | 6/2000 |
| JP | 2000-231149 A | 8/2000 |
| JP | 2000-312309 A | 11/2000 |
| JP | 2002-135797 A | 5/2002 |
| JP | 2005-151029 A | 6/2005 |
| JP | 2005-208601 | 9/2010 |

OTHER PUBLICATIONS

"Mega Pixel Battle between SONY and Matsushita" Video Salon, Oct. 1, 2000, vol. 40, No. 4, p. 46-55, Japan.

* cited by examiner

*Primary Examiner* — Lin Ye
*Assistant Examiner* — Mekonnen Dagnew
(74) *Attorney, Agent, or Firm* — RatnerPrestia

(57) ABSTRACT

An imaging apparatus has an optical zoom function, with which the image imaged on the imaging device (CCD) is enlarged and reduced by moving an optical system, and an electronic zoom function, with which the image data generated by the imaging device is electronically enlarged and reduced. In an imaging mode (pixel-number conversion mode) in which the image generated by the imaging device is recorded with the number of pixels lower than that of the imaging device, the imaging apparatus performs control so that only the electronic zoom is actuated when a total zoom magnification is not more than a predetermined value.

3 Claims, 17 Drawing Sheets

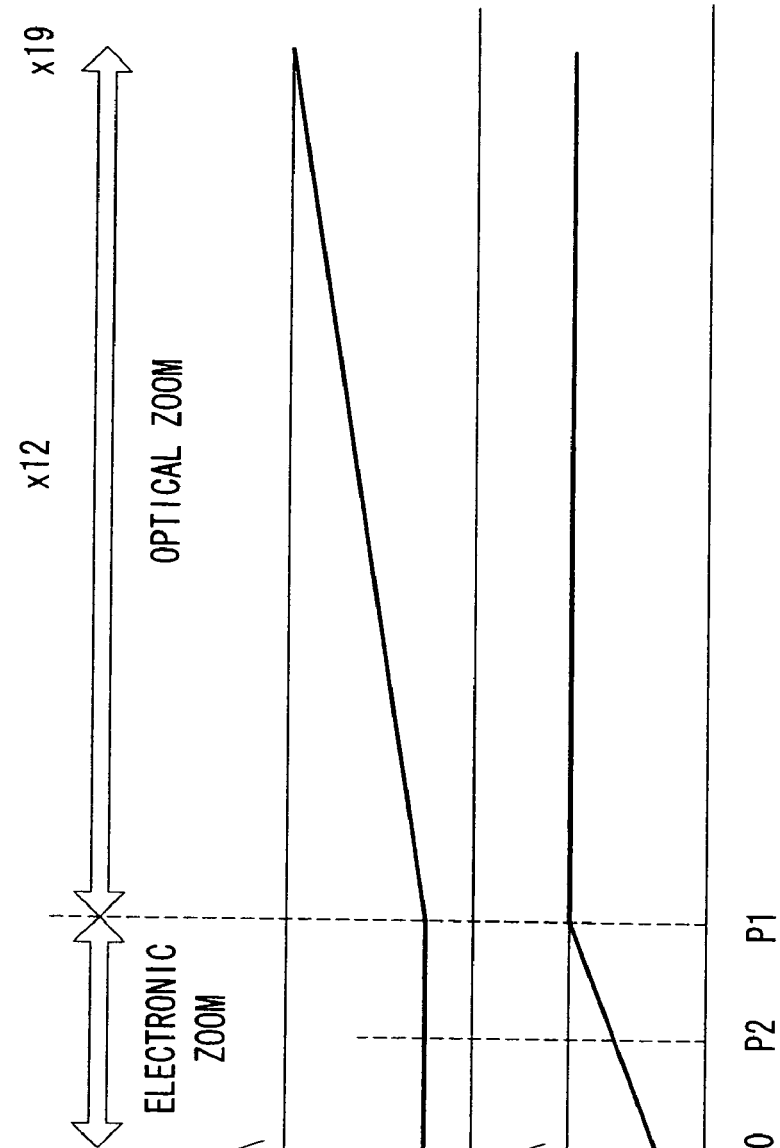

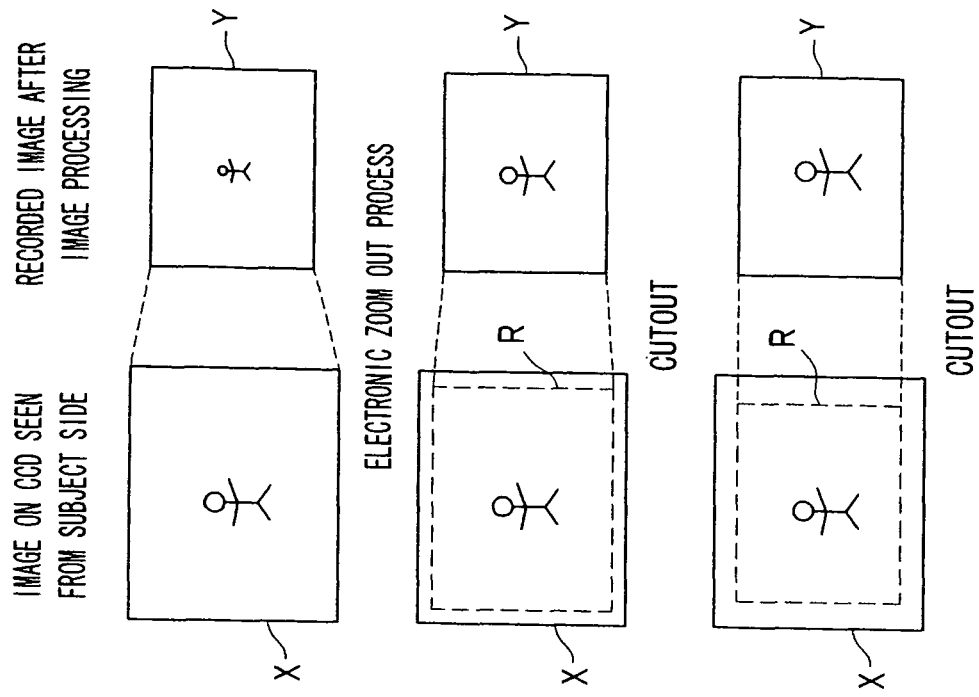
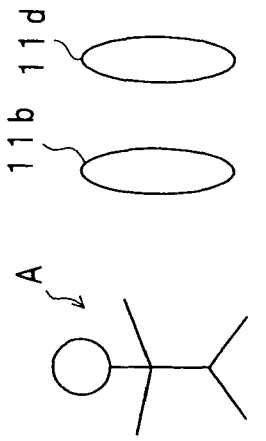
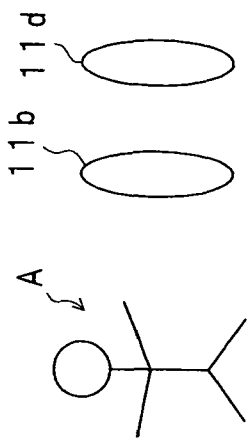
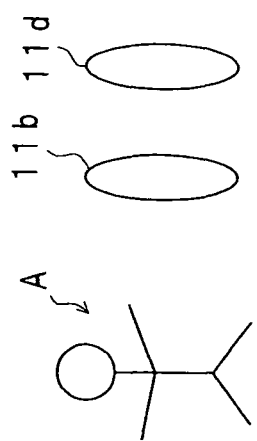
Fig. 3A
OPTICAL ZOOM × 1,
ELECTRONIC ZOOM × 0.62
Fig. 3B
OPTICAL ZOOM × 1,
ELECTRONIC ZOOM × 0.8
Fig. 3C
OPTICAL ZOOM × 1,
ELECTRONIC ZOOM × 1

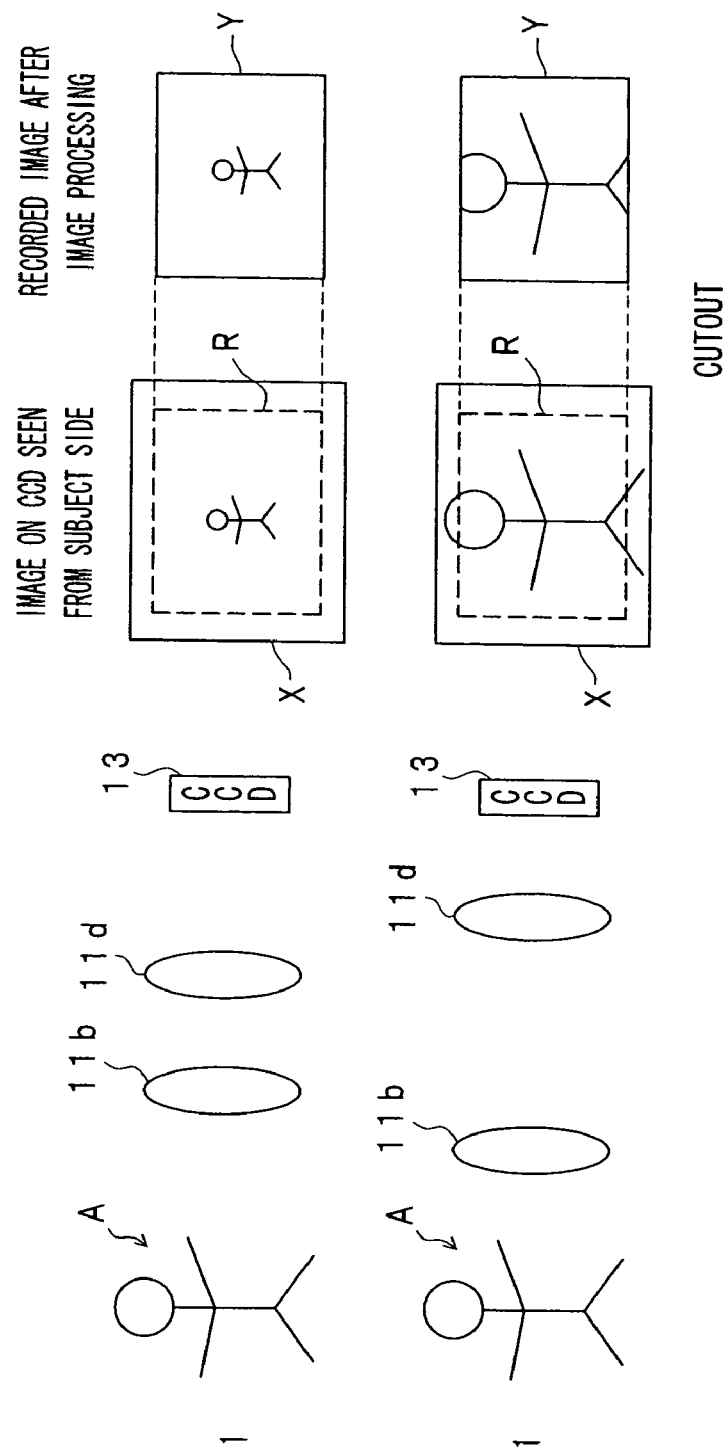

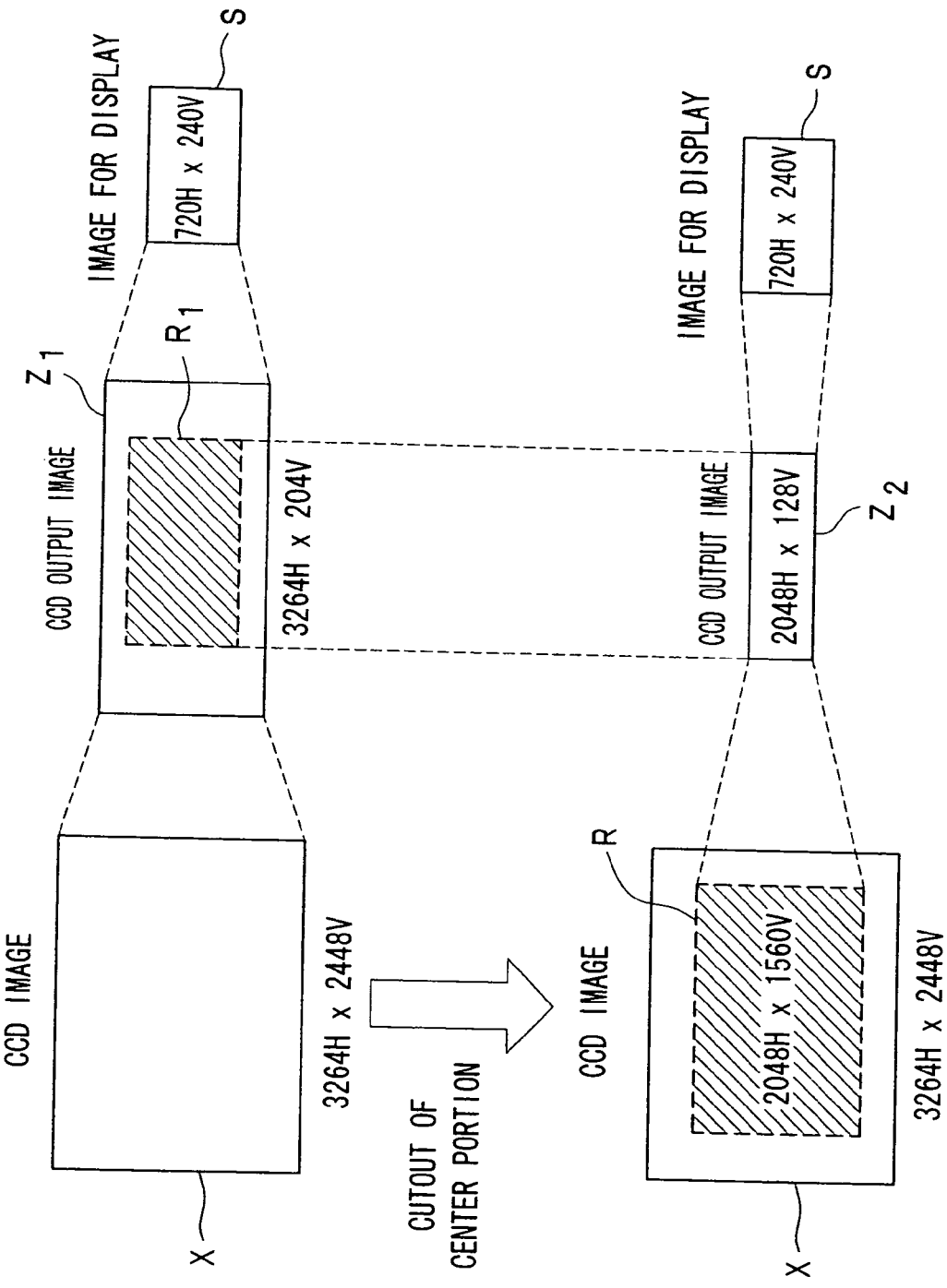

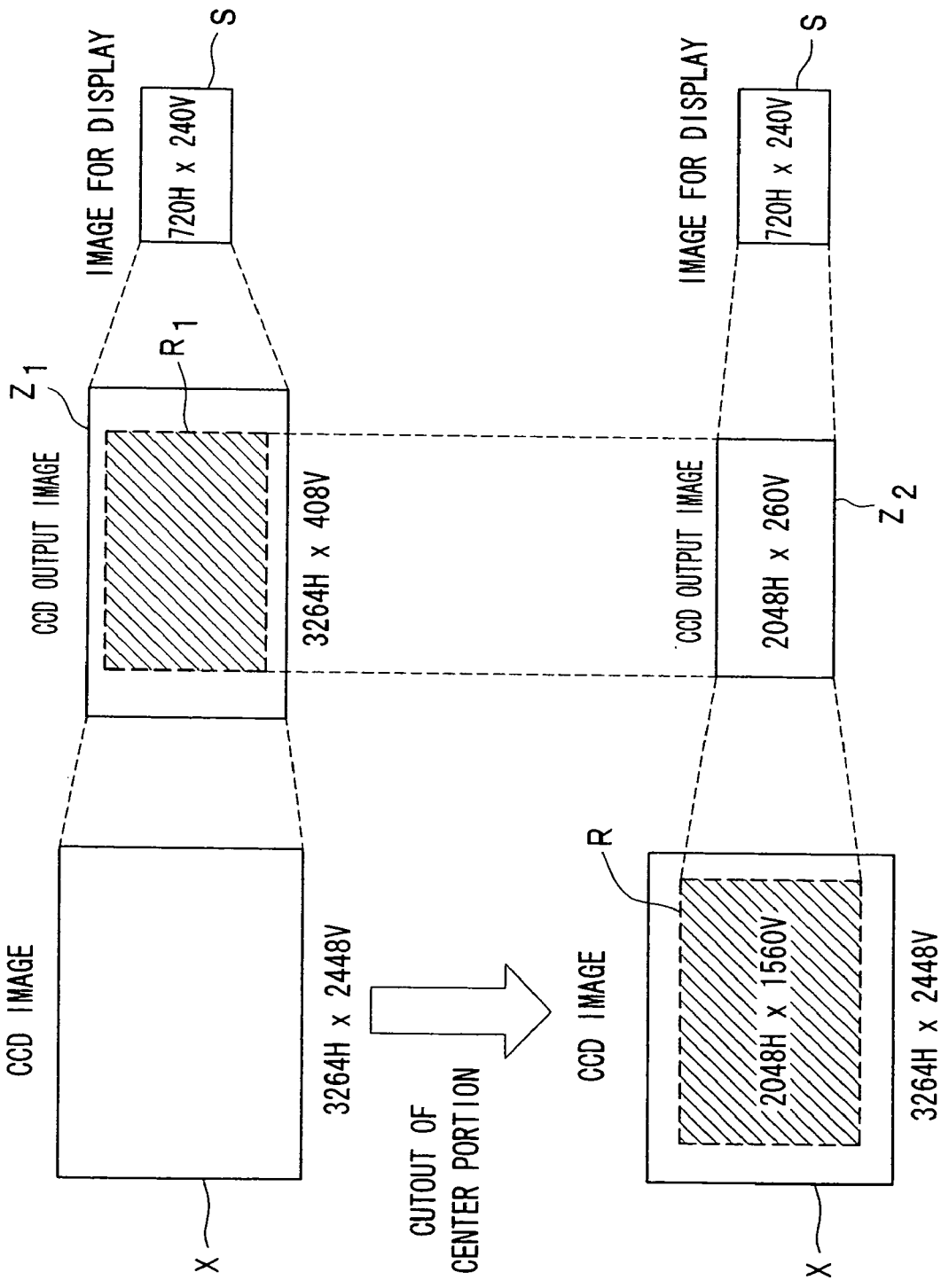

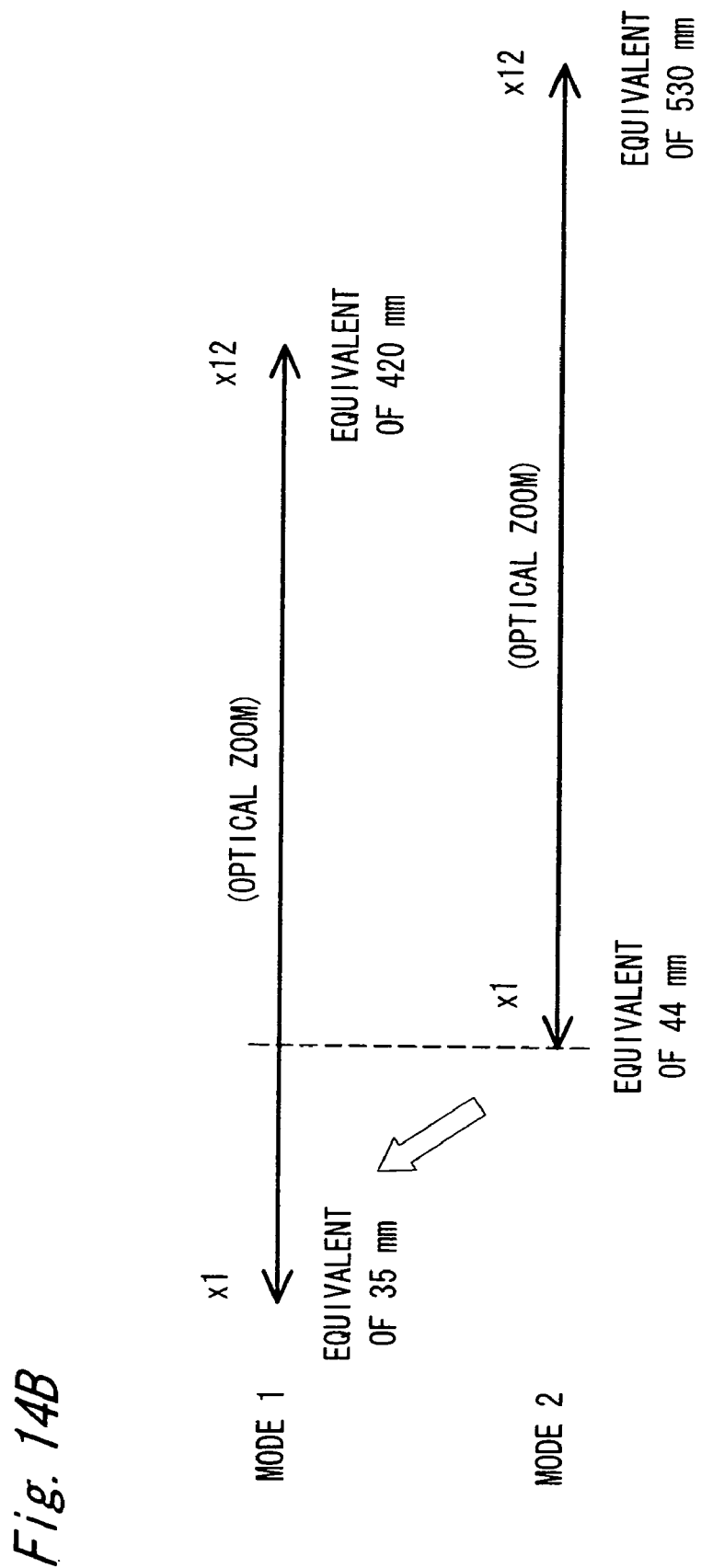

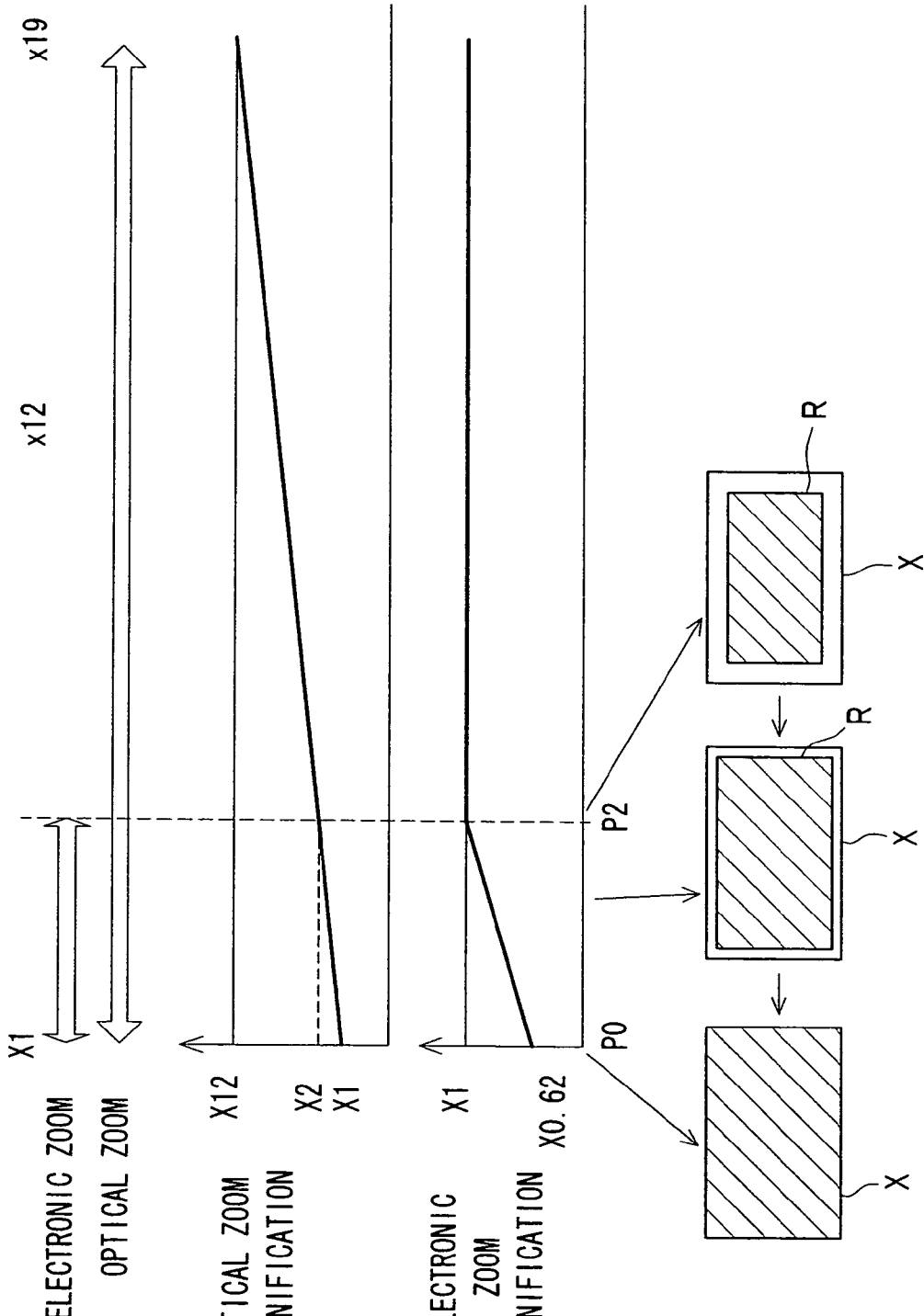

IMAGING APPARATUS HAVING OPTICAL ZOOM AND ELECTRONIC ZOOM FUNCTIONS

BACKGROUND OF THE INVENTION

1. Technical Field of the Invention

The present invention relates to an imaging apparatus capable of recording an image electronically, and in particular to the imaging apparatus having both an optical zoom function and an electronic zoom function.

2. Related Art

Recently, a digital camera which electronically records an image has been widespread, replacing a film camera. Usually the digital camera has an optical zoom function and an electronic (digital) zoom function. In the optical zoom function, a size of the image imaged on an imaging device such as a CCD (Charge Coupled Device) is optically varied by varying a lens position of an optical system. In the electronic zoom function, magnification of the image is varied by digitally processing an output signal of the imaging device.

In the optical zoom, the size of the image imaged on the CCD is changed by moving a zoom lens, which enlarges and reduces the image. In this case, a recorded image is generated using all the pixels of the image on the CCD. On the other hand, in the electronic zoom, a part region of the image imaged on the CCD is cut out, and processes such as complementation and averaging are applied to the image of the cutout region to generate the recorded image having desired magnification. In this case, the zoom magnification is changed based on the size of the cutout region. An amount of optical information obtained by the CCD is not changed during the electronic zoom, and thus it is generally thought that image quality is degraded when the image is enlarged by the electronic zoom.

In the conventional digital camera, the optical zoom is utilized in region on a wide angle side of the optical zoom, and switched to the electronic zoom when the zoom lens reaches an end on a telephoto side (see JP-A-2000-231149). Thus, large magnification is realized by combination of the optical zoom and the electronic zoom.

Generally, performance of the lens degrades more (shading, chromatic aberration, degradation of resolution, and the like) towards a peripheral portion of the lens. In the conventional zoom method, the optical zoom is performed in the region on the wide angle side, and thus the recorded image is generated using all the pixels (whole region) of the image imaged on the imaging device. That is, the recorded image is generated using the image including the image formed by the region of the lens peripheral portion. As a result, there is a problem that the image quality of the recorded image is degraded by the influence of the performance degradation (shading, chromatic aberration, and degradation of resolution) in the lens peripheral portion.

The invention is directed to the foregoing problem, and has an object to provide an imaging apparatus capable of providing an imaged image of which image quality degradation can be suppressed with no influence of lens performance degradation in the lens peripheral portion during the zoom action.

SUMMARY OF THE INVENTION (1) A first imaging apparatus of the invention includes an optical system operable to collect optical information from a subject, an imaging device operable to convert the optical information from the optical system into an electric signal to generate image data, an optical zoom section operable to move the optical system to enlarge and/or reduce an image imaged on the imaging device, an electronic zoom section operable to electronically enlarge and/or reduce the image data generated by the imaging device, and a controller operable to control the optical zoom section and the electronic zoom section. In an imaging mode in which the image generated by the imaging device is recorded with the number of pixels lower than that of the imaging device, the controller controls the zoom sections so as to actuate only the electronic zoom section when a total zoom magnification is not more than a predetermined value.

The controller may control the zoom sections so as to actuate only the optical zoom section when the total zoom magnification is more than the predetermined value.

Alternatively, the controller may control the electronic zoom section so as not to use magnification of the electronic zoom section in a predetermined range in the vicinity of 1.

Alternatively, the controller may control the zoom sections so as to actuate both the optical zoom section and the electronic zoom section when the total zoom magnification is more than the predetermined value.

(2) A second imaging apparatus of the invention includes an optical system operable to collect optical information from a subject, an imaging device having a plurality of pixel lines and operable to convert the optical information from the optical system into an electric signal to generate image data, a display section operable to convert an image read from the imaging device into a through image to display the through image, an electronic zoom section operable to electronically-enlarge and/or reduce the image data generated by the imaging device, and a controller operable to switch a driving mode of the imaging device. A plurality of modes are provided as the driving mode, the number of pixel lines of the image data outputted from the image device is different in each mode. In an imaging mode in which the image generated by the imaging device is recorded with the number of pixels lower than that of the imaging device, the controller changes the driving mode according to enlarging magnification and/or reducing magnification of the electronic zoom section.

Alternatively, the driving mode may include a first mode and a second mode. In the first mode, an image signal only for the predetermined number of pixel lines of the imaging device may be outputted. In the second mode, the image signal for the number of pixel lines larger than that of the first mode may be outputted. The controller may set the drive mode at the first mode in an imaging mode in which the image generated by the imaging device is recorded with the number of pixels equal to that of the imaging device. The controller may set the drive mode at the second mode in an imaging mode in which the image generated by the imaging device is recorded with the number of pixels less than that of the imaging device.

(3) A third imaging apparatus of the invention includes an optical system operable to collect optical information from a subject, an imaging device operable to convert the optical information from the optical system into an electric signal to generate image data, a hand shake compensation section operable to compensate a position of the optical system according to hand shake, an image processor operable to process the image data generated by the imaging device to generate a recorded image to be recorded in a recording medium, and a controller operable to control the hand shake compensation section. The controller changes a maximum value of a compensation amount of the hand shake compensation section according to a size of a region on the imaging device from which the image data to be processed by the image processor is generated.

(4) A fourth imaging apparatus of the invention includes an optical system operable to collect optical information from a subject, an imaging device operable to convert the optical information from the optical system into an electric signal to generate image data, a zoom setting ring operable to set zoom magnification of the optical system, an optical system moving mechanism operable to move the optical system according to the setting on the zoom setting ring, an image processor operable to process the image data generated by the imaging device to generate a recorded image to be recorded in a recording medium, and a region switching section operable to switch a region on the imaging device from which the image data to be processed by the image processor is generated.

The optical system, the zoom setting ring, and the optical system moving mechanism may be arranged in a lens barrel which is detachably attached to a main body of the imaging apparatus.

(5) A fifth imaging apparatus of the invention includes an optical system operable to collect optical information from a subject, an imaging device operable to convert the optical information from the optical system into an electric signal to generate image data, a zoom setting ring operable to set zoom magnification of the optical system, an optical system moving mechanism operable to move the optical system according to the setting on the zoom setting ring, an electronic zoom section operable to electronically enlarge and/or reduce the image data generated by the imaging device, and a controller operable to set enlarging magnification and/or reducing magnification of the electronic zoom section according to the zoom magnification set by the zoom setting ring.

The optical system, the zoom setting ring, and the optical system moving mechanism may be arranged in a lens barrel which is detachably attached to a main body of the imaging apparatus.

A region on the imaging device from which the image data to be processed by the electronic zoom section is generated may be variable according to the enlarging magnification and/or reducing magnification set by the controller.

According to the invention, in the zoom action on the wide angle side, only the electronic zoom is actuated and thus the peripheral region of the imaging device cannot be used for generation of the recorded image. As a result, in the recorded image, the influence of the performance degradation in the lens peripheral portion can be eliminated, and the degradation of the image quality can be prevented.

BRIEF DESCRIPTION OF DRAWINGS

FIGS. 2A and 2B are diagrams for explaining a zoom action performed by an imaging apparatus in a first embodiment.

FIGS. 3A to 3C are diagrams for explaining an electronic zoom action in the first embodiment.

FIGS. 4A and 4B are diagrams for explaining an optical zoom action in the first embodiment.

FIG. 10 is a diagram for explaining a problem in a draft drive mode of a CCD.

FIG. 11 is a diagram explaining a CCD output signal during a high-resolution mode in a fourth embodiment.

FIG. 14B is a diagram explaining the two imaging modes in the sixth embodiment.

FIGS. 16A and 16B are diagrams for explaining a zoom action performed by an imaging apparatus in the seventh embodiment.

DETAIL DESCRIPTION OF PREFERRED EMBODIMENTS

Preferred embodiments of the invention are described below with reference to the accompanying drawings. The below-mentioned imaging apparatus is an apparatus which converts optical image information into an electric signal to record the electric signal electronically to the recording medium. Examples of such an imaging apparatus include a digital still camera.

First Embodiment

Figure 1:
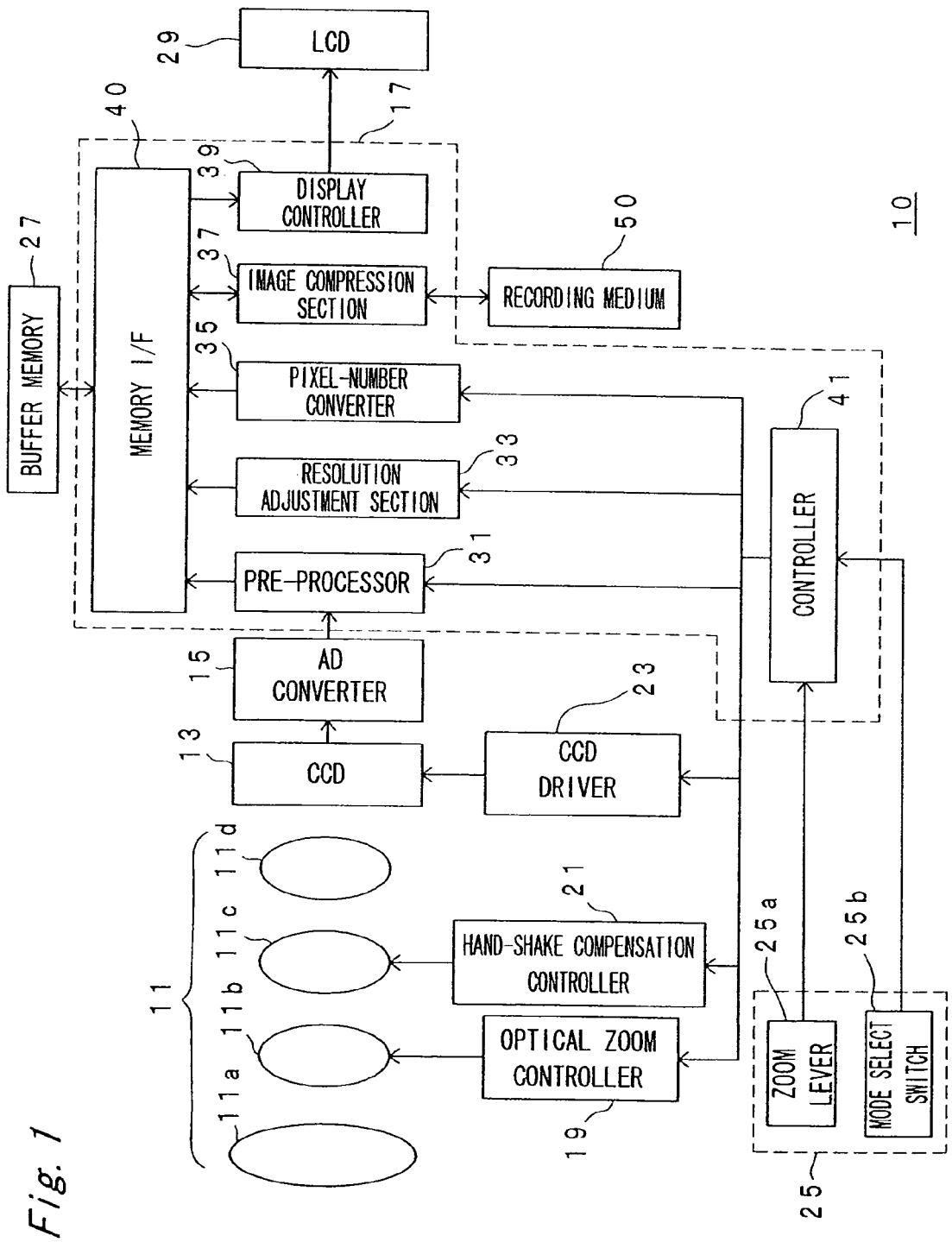
FIG. 1 is a diagram showing an example configuration of an imaging apparatus according to the invention.

FIG. 1 is a view showing a configuration example of an imaging apparatus according to the invention. An imaging apparatus 10 includes an optical system 11, a CCD 13 which is an imaging device, an AD converter 15 for converting an analog signal from the CCD 13 into a digital signal, and a control circuit 17 for controlling the whole processes of the imaging apparatus including a process of an image signal from the AD converter 15.

The optical system 11 includes four lenses 11a to 11d. The lens 11b is a zoom lens, and the lens 11c is a lens provided for compensating hand shake. The optical system 11 is arranged in a lens barrel.

The imaging apparatus 10 further includes an optical zoom controller 19 for driving the zoom lens 11b, a hand shake compensation controller 21 for driving the hand shake compensation lens 11c, and a CCD driver 23 for driving the CCD 13. The optical zoom controller 19 includes an electromechanical mechanism which conveys the zoom lens 11b in an optical axis direction. The hand shake compensation controller 21 includes an electromechanical mechanism which moves the hand shake compensation lens 11c in a direction perpendicular to the optical axis direction. These controllers 19 and 21 control positions of the lenses 11b and 11c according to a command from the control circuit 17 respectively.

The imaging apparatus 10 also includes an operation unit 25 through which a user performs various operations, a buffer memory 27 which stores image data tentatively for image processing, and a liquid crystal display (LCD) device 29 for displaying directly a through-image which is an image being shot by the CCD 13 or a still image which has been shot by the CCD 13. The operation unit 25 includes a zoom lever 25a for operating zoom magnification and a mode select switch 25b.

The control circuit 17 includes a pre-processor 31, a resolution adjustment section 33, a pixel-number converter 35, an image compression section 37, a display controller 39, a memory interface 40, and a controller 41. The control circuit 17 can be formed by a semiconductor integrated circuit.

The pre-processor 31 receives an image signal from the AD converter 15 to perform pre-processing, such as white balance correction, gamma correction, and blemish correction. The resolution adjustment section 33 converts the pre-processed RGB signal to a YC signal, and then performs a process of adjusting resolutions such as aperture correction.

The pixel-number converter 35 performs signal processing for changing the number of pixels of the image signal. The pixel-number converter 35 electronically enlarges and reduces the image by pixel interpolation and pixel skipping, realizing the electronic zoom function.

The image compression section 37 compresses an image in JPEG method. The image compression method is not limited to JPEG. The image compressed by the image compression section 37 is finally stored in a recording medium 50. The display controller 37 controls image display on the LCD device 29. The recording medium 50 includes a hard disk drive or a semiconductor memory device using a flash memory, such as SD card (registered trademark) and CompactFlash (registered trademark).

The pre-processor 31, the resolution adjustment section 33, the pixel-number converter 35, the image compression section 37, and the display controller 39 access the buffer memory 27 through the memory interface 40 to appropriately read data before each process and write data after each process.

The controller 41 controls, for image signal processing, the pre-processor 31, the resolution adjustment section 33, the pixel-number converter 35, the image compression section 37, and the display controller 39. The controller 41 further controls the optical zoom controller 19 and the hand shake compensation controller 21 to control the action of the optical system, and controls the CCD driver 23 to control an output signal of the CCD 13.

The zoom action of the imaging apparatus 10 will be described below. Then, particularly the zoom action in a pixel-number conversion mode will be described in detail. As used herein, the pixel-number conversion mode shall mean a operation mode to record an image to the recording medium 50 with smaller number of pixels than that of the CCD 13. For example, in the pixel-number conversion mode, when the CCD 13 has the number of pixels of eight million, the image of three million pixels is recorded in the recording medium. In the pixel-number conversion mode, an image data size becomes small, and thus the large number of images can be recorded in the recording medium. Therefore, this mode is useful for a user who does not demand the high-quality image.

The imaging apparatus 10 has optical zoom and electronic zoom for the zoom function. The optical zoom is achieved by moving the zoom lens 11b in, the optical axis direction to enlarge and reduce the image size imaged on the CCD 13. The electronic zoom is achieved by applying image processing by the pixel-number converter 35, such as pixel interpolation and pixel skipping, to the image obtained by the CCD 13, thereby enlarging and reducing the image size.

Particularly, as shown in FIGS. 2A and 2B, the imaging apparatus 10 activates the electronic zoom in a region of a zoom magnification on a wide angle side (low zoom magnification), and the optical zoom in a region of zoom magnification on a telescopic side (high zoom magnification).

In the present specification, "optical zoom actuation" shall mean a state in which the zoom lens 11b is moved in changing the zoom magnification (=optical zoom magnification×electronic zoom magnification), and "optical zoom stop" shall mean a state in which the zoom lens 11b is not moved in changing the zoom magnification. Accordingly, even in the state of the optical zoom action, the zoom lens 11c remains to be stopped unless a user changes the zoom magnification.

Electronic zoom actuation shall mean that the pixel-number converter 35 is actuated, and electronic zoom stop shall mean that the pixel-number converter 35 is stopped. In the electronic zoom stop, the pixel-number converter 35 performs neither the enlargement nor reduction of the image, and thus the electronic zoom magnification becomes ×1. In the state of the electronic zoom actuation, the pixel-number converter 35 operates even if a user does not change the zoom magnification.

Then, the zoom action of the imaging apparatus 10 will be described in detail with reference to FIGS. 3 and 4. In the following description, the zoom action is described under the following conditions. The CCD 13 has the number of pixels of eight million. The pixel-number conversion mode is a mode in which the image is recorded with the number of pixels of three million in the recording medium 50. The zoom magnification is changed from the wide angle side toward the telescopic side. In FIGS. 3 and 4, an image X indicates the image imaged on the CCD 13, and an image Y indicates the image (recorded image) recorded in the recording medium 50.

First the electronic zoom action will be described with reference to FIGS. 3A to 3C.

When neither the optical zoom nor the electronic zoom is actuated, the three-million-pixel image Y is generated from the eight-million-pixel image X on the CCD 13 as shown in FIG. 3A. That is, in the case of FIG. 3A, the image Y is obtained by electronically enlarging the whole of image X imaged on the CCD 13, 0.62 times ($=\sqrt{(3,000,000/8,000,000)}$). Thus, in the pixel-number conversion mode, the process (variable power) to reduce the original image X electrically to be of 0.62 times size, even in the state in which the zoom action is not actuated. The reducing process is performed by the pixel-number converter 35. The state shown in FIG. 3A corresponds to that at a point P0 of FIGS. 2A and 2B.

In the electronic zoom, as shown in FIGS. 3B and 3C, when the zoom magnification is increased from the state of FIG. 3A, the image of a region R which is a part of the image X obtained by CCD 13 is cut out. The pixel-number conversion process of converting the image into the three-million-pixel image is applied to the cutout image of the region R. The cutting process of the image may be performed prior to any one of the processes performed by the pre-processor 31, the resolution adjustment section 33, the pixel-number converter 35, the image compression section 37, and the display controller 39.

Thus, in the electronic zoom, the whole pixel region on the CCD 13 is not used, but only a part of the region including the central portion of the CCD 13 is used. The electronic zoom magnification is determined according to the size of the cutout region (namely, usage region of CCD) R, and it is increased by decreasing the size of the cutout region R.

FIG. 3B is a diagram showing a state when the electronic zoom magnification is between 0.62 and 1, that is, a state at a point P2 of FIGS. 2A and 2B. FIG. 3C is a diagram showing a state when the electronic zoom magnification reaches the maximum value (×1), i.e., a state at a point P1 of FIGS. 2A and 2B. The size of the cutout region R of FIG. 3B is smaller than that of the whole of image X. Thus, a pixel-number conversion rate of FIG. 3B is larger than that of FIG. 3A, in converting the image into the three-million-pixel image Y.

Accordingly, when compared with the case of FIG. 3A, the further enlarged image Y is obtained in the case of FIG. 3B.

As shown in FIG. 3C, when the electronic zoom magnification becomes the maximum (×1), the size of the cutout region R becomes the minimum. In this time, the image of the region R in the image X on the CCD has size equal to that of the recorded image Y. That is, the pixel-number conversion rate becomes 1.

Then, the optical zoom action will be described with reference to FIGS. 4A to 4C. As shown in FIGS. 2A and 2B, in the first embodiment, when the electronic zoom reaches the limit thereof, the zoom is switched from the electronic zoom to the optical zoom. That is, after the electronic zoom magnification becomes the maximum (×1) (see FIGS. 3C and 4A), when the zoom magnification is increased further with the zoom lever 25a, the optical zoom is actuated.

In the optical zoom, the zoom magnification is increased by moving the zoom lens 11b, which enlarges image size of a subject A imaged on the CCD 13. The image of the region R is cut out from the whole of image X on the CCD 13, and the cutout image is set to the recorded image. In this case, the pixel conversion process is not performed. Thus, in the optical zoom, while the size of the image imaged on the CCD 13 is optically changed, the image of the region R (size of the minimum cutout region) is electronically cut out from the image X on the CCD 13 to produce the recorded image Y.

Figure 5:
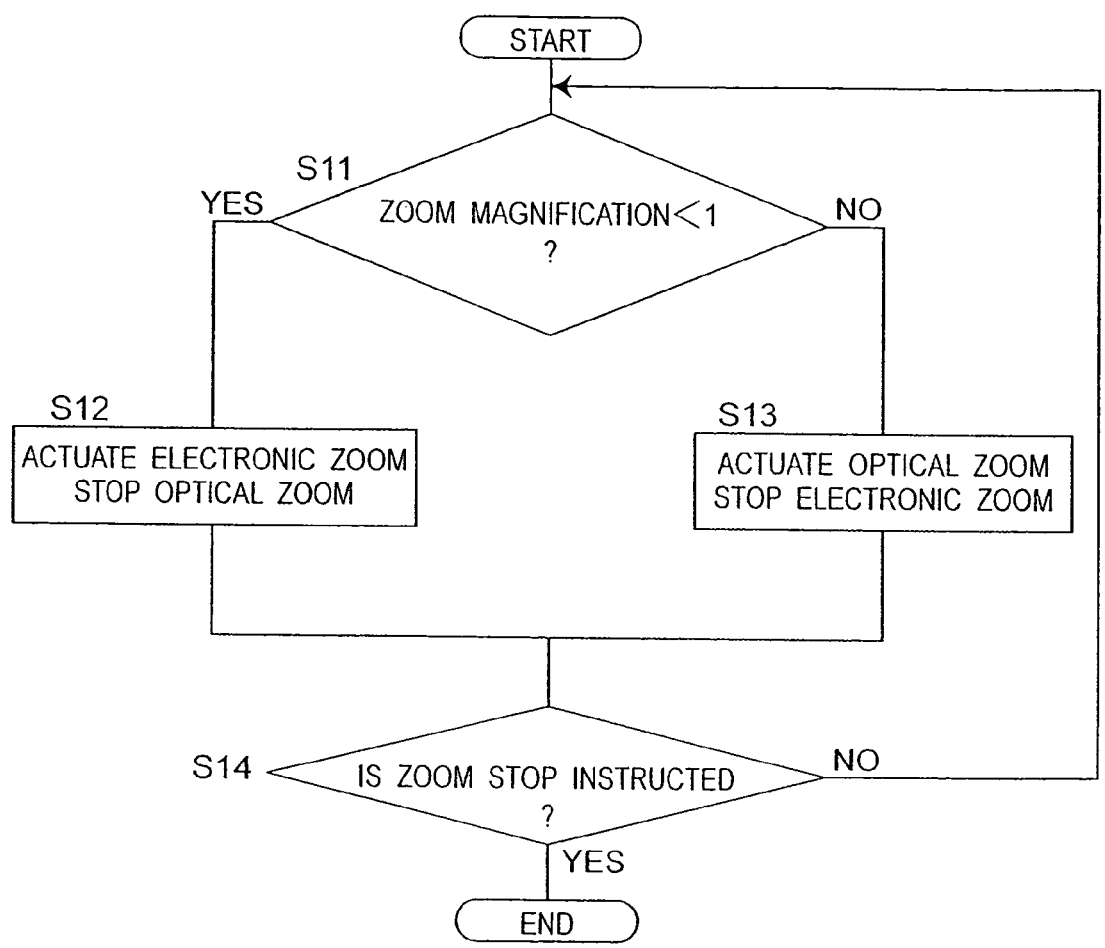
FIG. 5 is a flowchart of the zoom action performed by the imaging apparatus in the first embodiment.

FIG. 5 is a flowchart showing the zoom action of the imaging apparatus 10. When a user operates the zoom lever 25a to start the zoom action, it is determined whether the total zoom magnification is lower than 1 at that time (S11). It is noted that the total zoom magnification shall mean a value defined by the product of the optical zoom magnification and the electronic zoom magnification. Hereinafter the total zoom magnification is simply referred to as "zoom magnification." When the zoom magnification is lower than 1, the electronic zoom is actuated and the optical zoom is stopped (S12). On the other hand, when the zoom magnification is not lower than 1, the optical zoom is actuated and the electronic zoom is stopped (S13). The above steps are repeated until a user performs a zoom stop operation (S14).

As described above, according to the first embodiment, in the zoom action of the pixel-number conversion mode, the electronic zoom is activated when the zoom magnification is low. In the electronic zoom, the recorded image Y is generated based on a part of region of the image X, which includes a center part of the image X imaged on the CCD. Therefore, when the zoom magnification is low, the region of the peripheral portion of the image X which includes the image imaged by the lens peripheral portion, is not used. Accordingly the affect of the performance degradation caused in the lens peripheral portion can be eliminated in the recorded image Y, and the degradation of the image quality can be prevented in the recorded image Y.

Second Embodiment

In the zoom action of the first embodiment, as shown in FIGS. 2A and 2B, the electronic zoom is actuated on the wide angle side, and it is switched to the optical zoom at the end point of the electronic zoom, i.e., in the point at which the electronic zoom magnification reaches 1. However, the electronic zoom does not exert so good performance near the magnification of 1. Therefore, in a second embodiment, the zoom function performed by the electronic zoom is not used in the region near the magnification of 1. The zoom action of the second embodiment will specifically be described with reference to FIGS. 6A and 6B.

Figure 6:
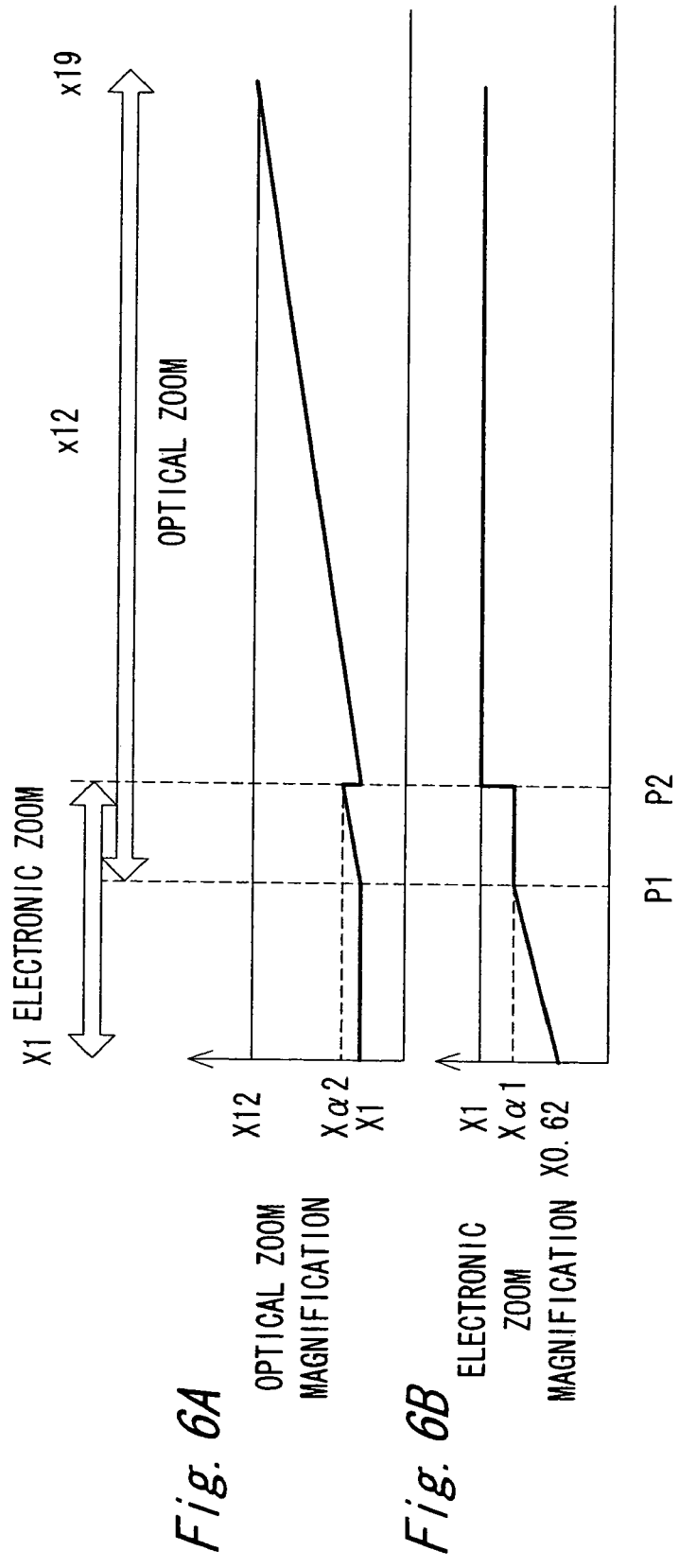
FIGS. 6A and 6B are diagrams for explaining a zoom action performed by an imaging apparatus in a second embodiment.

In FIGS. 6A and 6B, when the zoom magnification (=optical zoom magnification×electronic zoom magnification) is lower than a predetermined value $\alpha 1$, only the electronic zoom is actuated. On the other hand, when the zoom magnification is not lower than 1, only the optical zoom is actuated. When the zoom magnification is located between $\alpha 1$ and 1 (between the point P1 and the point P2), the electronic zoom and the optical zoom are actuated with the electronic zoom magnification fixed to $\alpha 1$.

The predetermined value $\alpha 1$ is set at a value close to 1 (for example, 0.8). When the zoom magnification reaches 1, the electronic zoom magnification and the optical zoom magnification are set at 1, respectively. The relationship of $\alpha 1 \times \alpha 2 = 1$ holds in FIGS. 6A and 6B.

Figure 7:
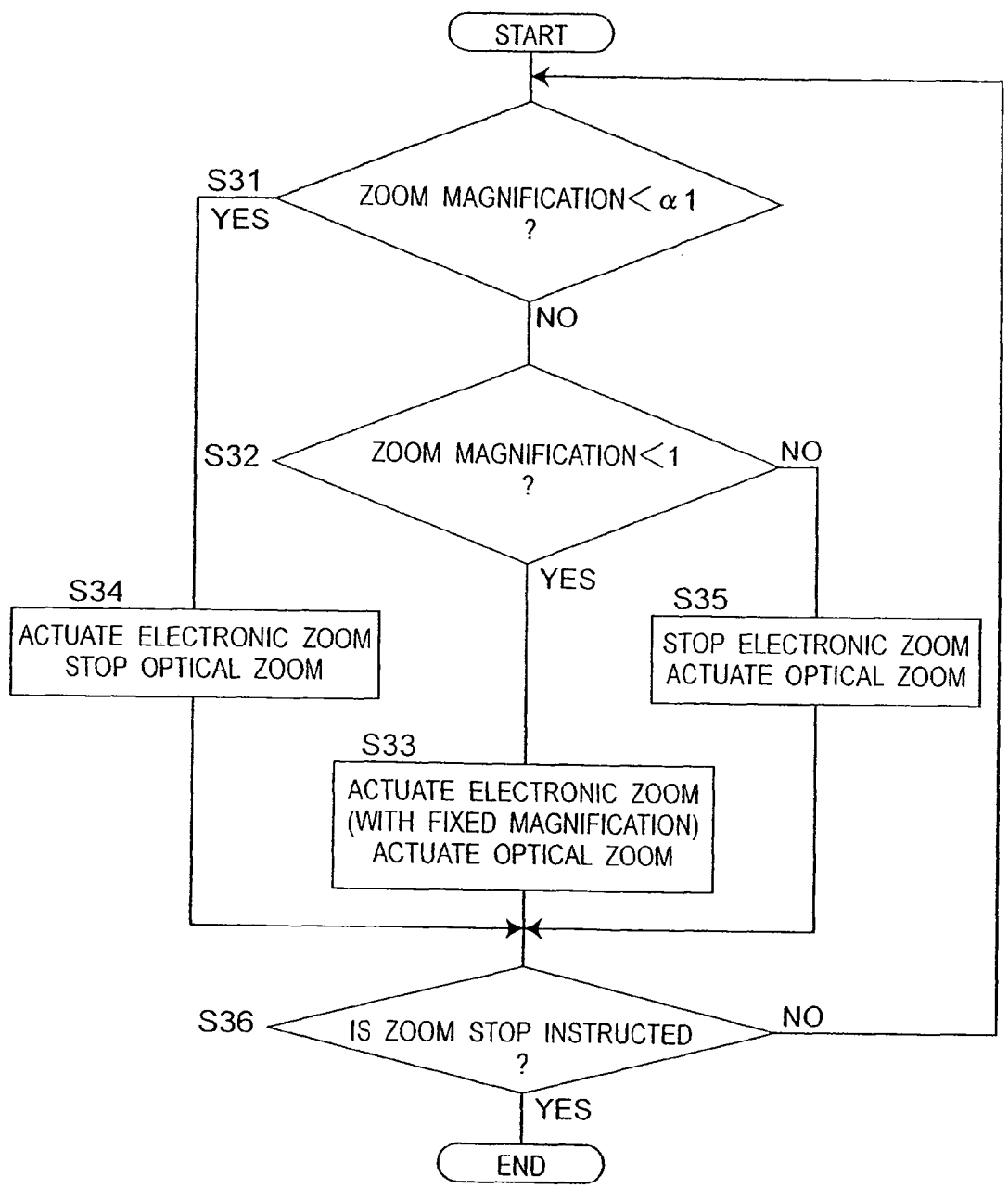
FIG. 7 is a flowchart of the zoom action performed by the imaging apparatus in the second embodiment.

The zoom action of the second embodiment will be described below with reference to a flowchart of FIG. 7. When a user operates the zoom lever 25a to start the zoom action, it is determined whether or not the zoom magnification (=optical zoom magnification×electronic zoom magnification) at that time is lower than $\alpha 1$ (S31). When the zoom magnification is lower than $\alpha 1$, the electronic zoom is actuated and the optical zoom is stopped (S34). On the other hand, when the zoom magnification is not lower than $\alpha 1$, it is further determined whether the zoom magnification is lower than 1 (S32). When the zoom magnification is lower than 1, the optical zoom is actuated while the electronic zoom is actuated at fixed magnification ($\alpha 1$) (S33). When the zoom magnification is not lower than 1, the optical zoom is actuated and the electronic zoom is stopped (S35). The above steps are repeated until a user performs the zoom stop operation (S36).

According to the method of the second embodiment, use of the magnification region ($\alpha 1$ to 1 power) which provides no good performance is avoided in the electronic zoom. Thus the good zoom image is obtained in the whole region of the zoom magnification.

Third Embodiment

The present embodiment describes an example in that, in addition to the above embodiment, the electronic zoom actuation region is enlarged, and a range in which both the electronic zoom and the optical zoom are used is enlarged.

Figure 8:
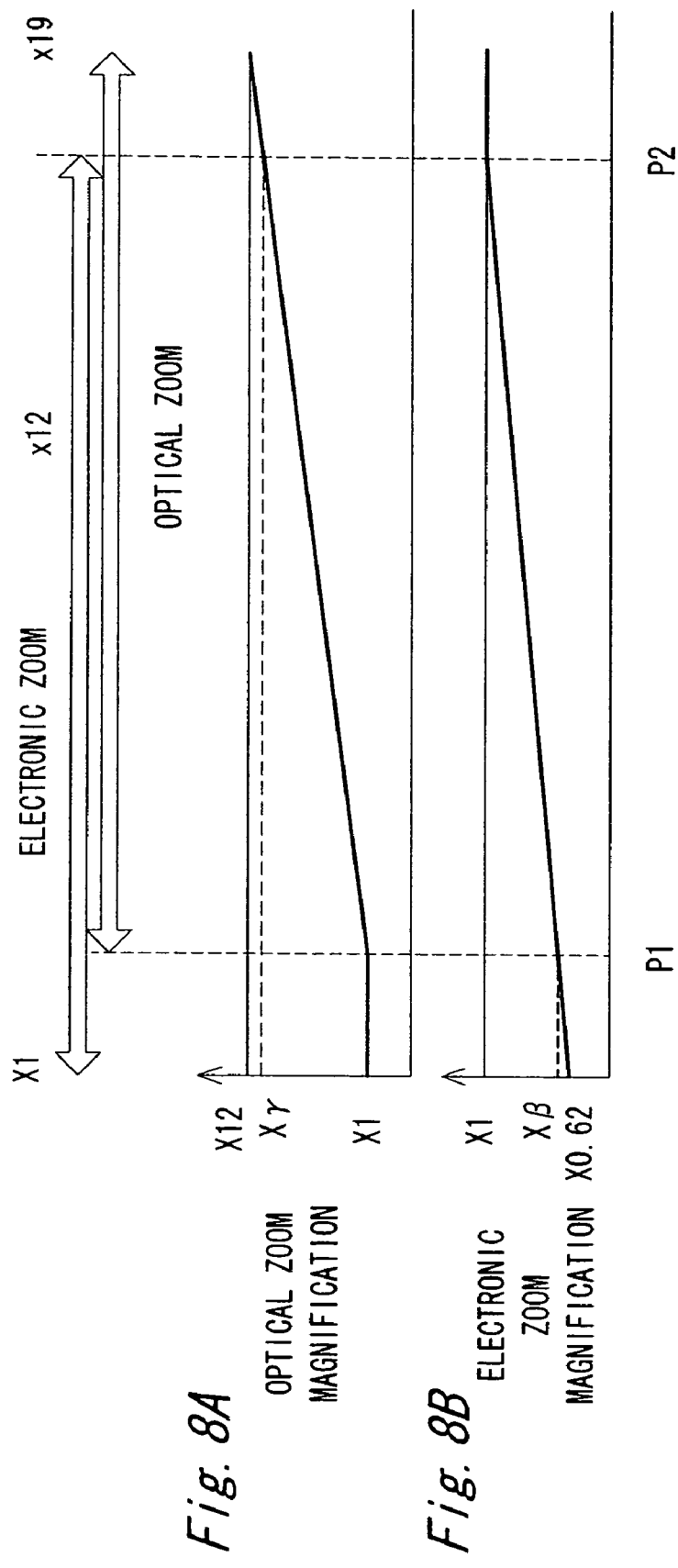
FIGS. 8A and 8B are diagrams for explaining a zoom action performed by an imaging apparatus in a third embodiment.

The zoom action of the third embodiment will specifically be described with reference to FIGS. 8A and 8B. In FIGS. 8A and 8B, the electronic zoom is actuated from a region having low zoom magnification (=optical zoom magnification×electronic zoom magnification) to a region having high zoom magnification. The optical zoom is stopped when the zoom magnification is lower than a predetermined value $\beta$, and is actuated when the zoom magnification is not lower than $\beta$. The electronic zoom is stopped when the electronic zoom magnification reaches 1 (at point P2).

Figure 9:
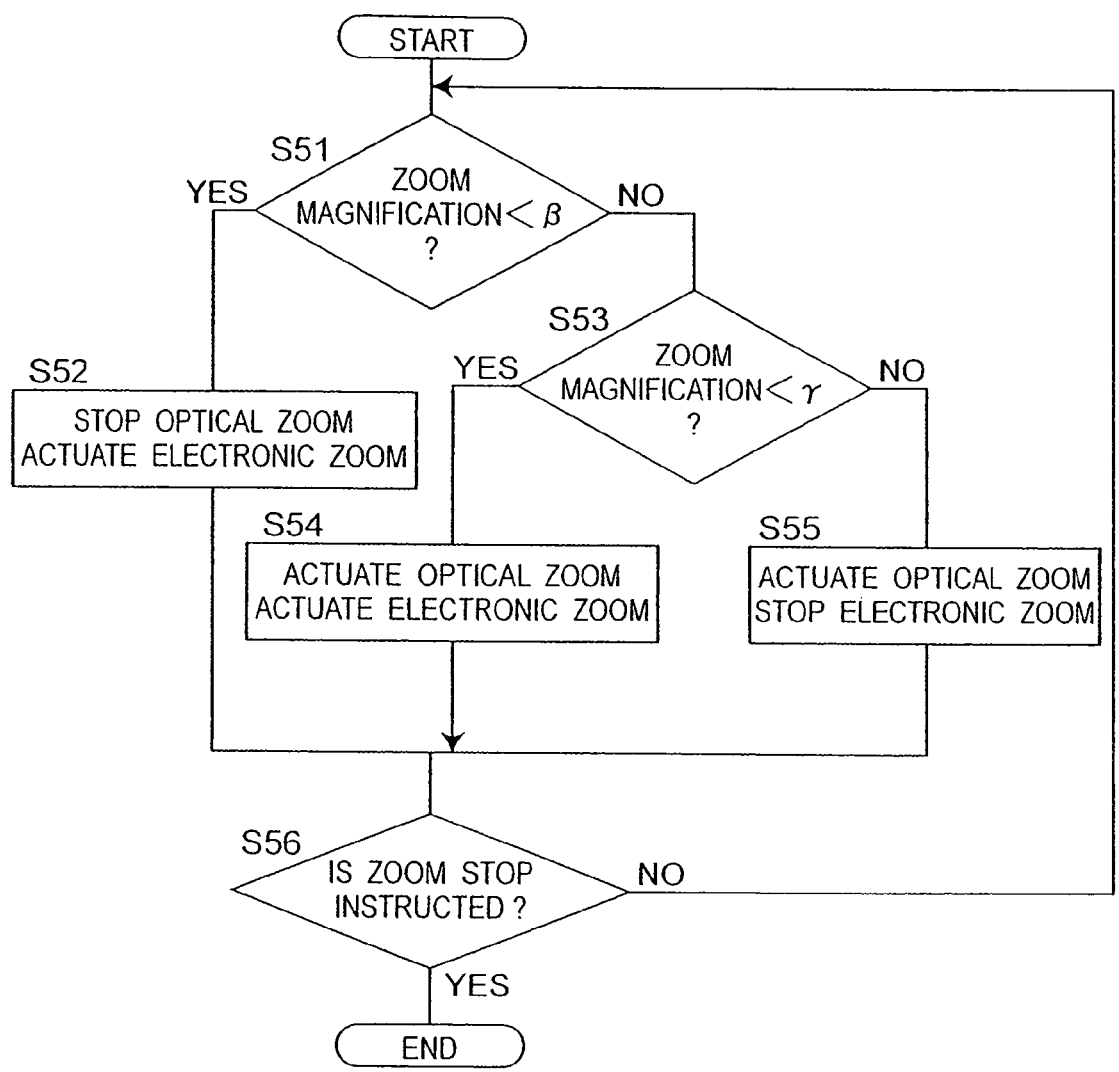
FIG. 9 is a flowchart of the zoom action performed by the imaging apparatus in the third embodiment.

FIG. 9 is a flowchart showing the zoom action of the third embodiment. When a user operates the zoom lever 25a to start the zoom action, it is determined whether the zoom magnification (=optical zoom magnification×electronic zoom magnification) at that time is lower than $\beta$ (S51). When the zoom magnification is lower than $\beta$, the electronic zoom is actuated and the optical zoom is stopped (S52). On the other hand, when the zoom magnification is not lower than $\beta$, it is further determined whether the zoom magnification is lower than $\gamma$ (S53). When the zoom magnification is lower than $\gamma$, the electronic zoom is actuated along with the optical zoom (S54). When the zoom magnification is not lower than $\gamma$, the optical zoom is actuated and the electronic zoom is stopped (S55). The above steps are repeated until a user performs the zoom stop operation (S56).

Thus, initially using only the electronic zoom on the wide angle side (low zoom magnification side) can prevent the image quality degradation caused by the performance degradation of the lens peripheral portion. Additionally, the region where both the electronic zoom and the optical zoom are used is provided, a changing point between the electronic zoom and the optical zoom becomes unclear, which improves the usability for a user in the zoom operation.

Fourth Embodiment

In the above embodiments, the imaging apparatus 10 includes the LCD device 29 (see FIG. 1). The LCD device 29 displays a through image which is an image (moving image) is inputted to the CCD 13 and outputted directly from the CCD 13, a shot still image, setting information, and the like. A user determines picture composition of the subject by viewing the through image displayed on the LCD device 29.

Usually the CCD 13 has a "draft drive mode" which outputs signals having number of lines obtained by skipping some lines in all lines, and a "high-resolution mode" which outputs a signal having the number of lines larger than that of the draft drive mode.

The pixel number of the LCD device 29 is smaller compared to that of the CCD 13 or the recorded image. Therefore, during the through image display, usually the CCD 13 is driven in the draft drive mode to output the image signals for the number of lines only necessary for the display of the LCD device 29.

On the other hand, when a user performs the zoom operation to actuate the electronic zoom during the through image display, the region R is cut out from the image X imaged on the CCD 13 to generate the recorded image Y. Therefore, it is necessary to display the image corresponding to the recorded image Y as the through image on the LCD device 29.

However, the CCD 13 is driven in the draft drive mode during the through image display, and thus the CCD 13 outputs an image Z1 having the number of lines (for example, 3264 H×204V) only necessary for the display of the LCD device 29 as shown in FIG. 10. Therefore, in this state, when a region R1 corresponding to the region R is cut out from the image Z1, the size (for example, 2048 H×128V) of the cutout image Z2 becomes smaller than the image size (for example, 720 H×240V) necessary for an image for display S of the LCD device 29. As a result, the quality of the image displayed on the LCD device 29 is degraded.

In this invention, the driving mode of the CCD 13 is changed from the draft drive mode to the high-resolution mode when the electronic zoom is actuated to generate the process of cutting out the image. In the high-resolution mode, the CCD 13 outputs the image having the size larger than that of the draft drive mode. For example, as shown in FIG. 11, in the high-resolution mode, the CCD 13 outputs the CCD output image Z1 having the number of lines (408V) which is twice the number of line (204V) of the draft drive mode. In this case, even if the region R1 is cut out from the image Z1, the size (2048 H by 260V) of the cutout image Z2 becomes larger than the image size (720 H by 240V) necessary for the display image S, preventing the degradation of the image display on the LCD device 29.

The size of the CCD output image Z1 in the high-resolution mode is determined according to the size of the cutout region R.

In a mode for recording the image imaged by the CCD 13 in the recording medium 50 with the same number of pixels as that of the CCD 13, the CCD 13 is driven in the draft drive mode, and the driving mode may be changed to the high-resolution mode when a user selects the pixel-number conversion mode.

Fifth Embodiment

In the above embodiments, the imaging apparatus 10 has means for compensating hand shake including the hand shake compensation lens 11c and the hand shake compensation controller 21 (see FIG. 1).

The hand shake compensation lens 11c is moved relatively to the CCD 13 according to a direction and amount of the hand shake to suppress the image distortion caused by the hand shake.

Figure 12A:
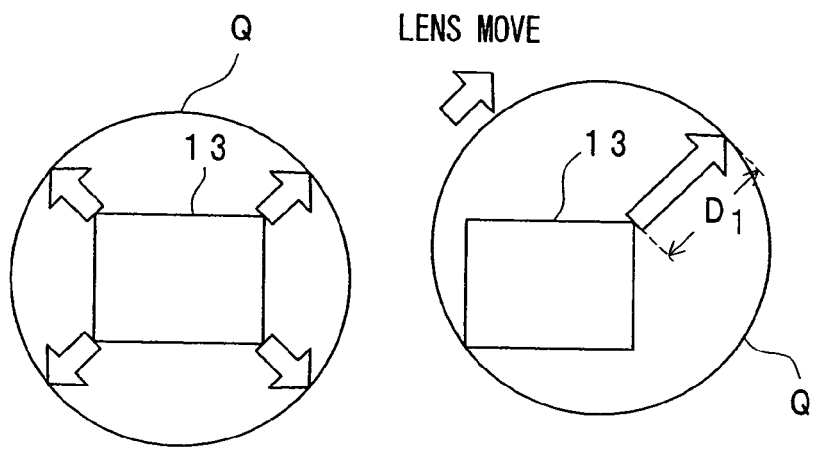
FIGS. 12A and 12B are diagrams for explaining a method of setting a correction lens drive range in a fifth embodiment.
Figure 12B:
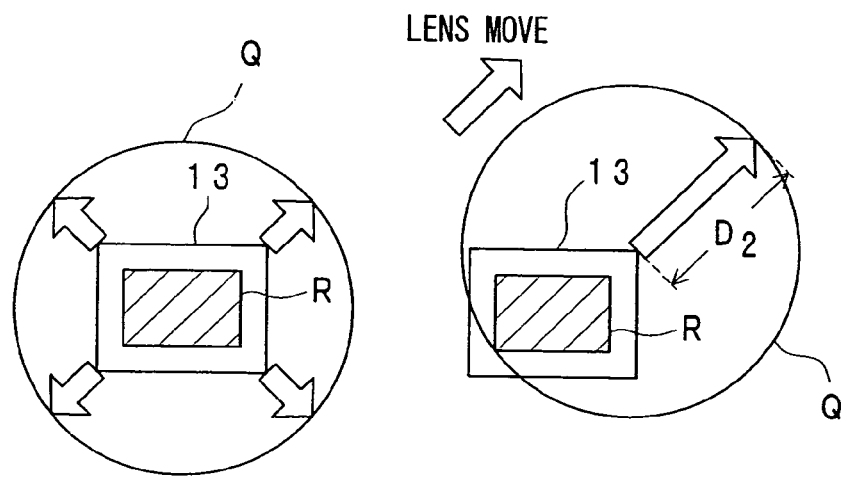

FIGS. 12A and 12B are a diagram showing a positional relationship between the CCD 13 and an imaging region Q which is formed in the same plane as imaging plane of the CCD 13 by the optical system 11. The imaging region Q moves as the hand shake compensation lens 11c moves as shown in FIGS. 12A and 12B.

As shown in FIG. 12A, usually the moving range of the hand shake compensation lens 11c is set such that the imaging region Q includes the whole imaging region of the CCD 13. Therefore, when the imaging region of the CCD 13 is large, a moving range D1 of the imaging region Q becomes small.

As shown in the above embodiments, during the electronic zoom action, the region R in the image X imaged on the CCD 13 is cut out to generate the recorded image Y. That is, the whole region in the CCD 13 is not required during the electronic zoom action, but only the cutout region R is required. Therefore, in the electronic zoom action, it is necessary that the hand shake compensation lens 11c cover at least the region R of the CCD 13. For this reason, a maximum moving distance D2 of the imaging region Q as shown in FIG. 12B becomes larger than a distance D1 in the case where the cutout process is not performed as shown in FIG. 12A. As a result, a maximum moving distance of the hand shake compensation lens 11c can also be increased. That is, when the cutout process is performed in the electronic zoom action, the maximum value of the moving distance of the hand shake compensation lens 11c can be set larger.

Therefore, in a fifth embodiment, when the cutout process occurs in the electronic zoom action, a setting value of the maximum moving distance of the hand shake compensation lens 11c is set at a setting value corresponding to a value according to the cutout region R. Thus, in the electronic zoom action, when the cutout process occurs, the hand shake compensation range can be enlarged. As a result, the hand shake can be compensated more strongly and the image quality degradation caused by the hand shake can be effectively reduced.

Sixth Embodiment

Figure 13:
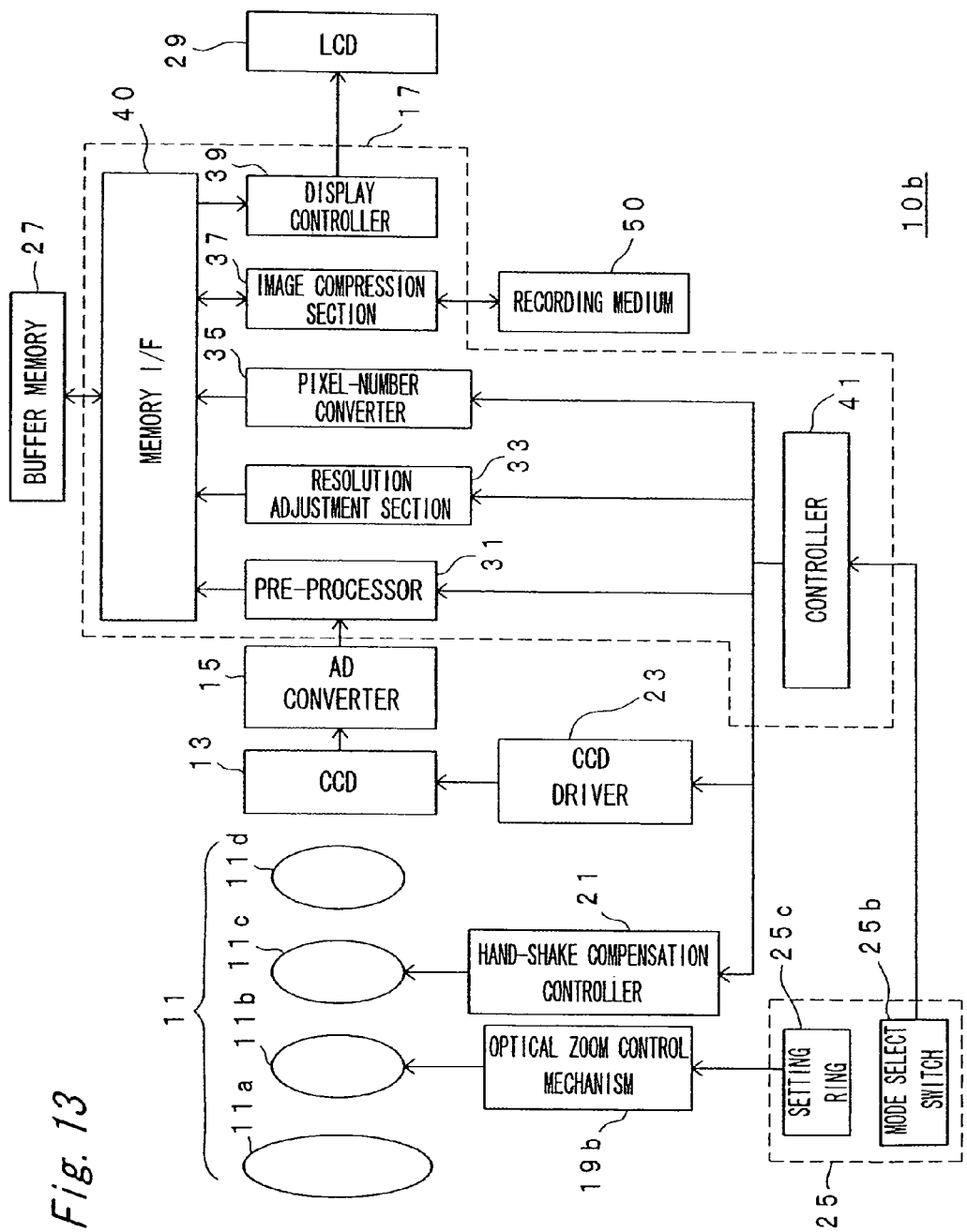
FIG. 13 is a diagram showing a configuration of an imaging apparatus in a sixth embodiment.

FIG. 13 shows another configuration of an imaging apparatus according to the invention. An imaging apparatus of the sixth embodiment has the same configuration of the apparatus 10 shown in FIG. 1, including an optical zoom control mechanism 19b and a zoom setting ring 25c instead of the optical zoom controller 19 and the zoom lever 25a shown in FIG. 1, respectively. The lens barrel of the sixth embodiment can be detachably attached to a main body of the imaging apparatus.

The optical zoom control mechanism 19b is a mechanical mechanism which can move the zoom lens 11b in the optical axis direction, and is provided inside the lens barrel. The zoom setting ring 25c is a ring-shape mechanism which is rotatably mounted around the lens barrel. The optical zoom control mechanism 19b moves the zoom lens 11b in the optical axis direction in conjunction with the mechanical rotation of the zoom setting ring 25c by a user's manual operation.

Figure 14A:
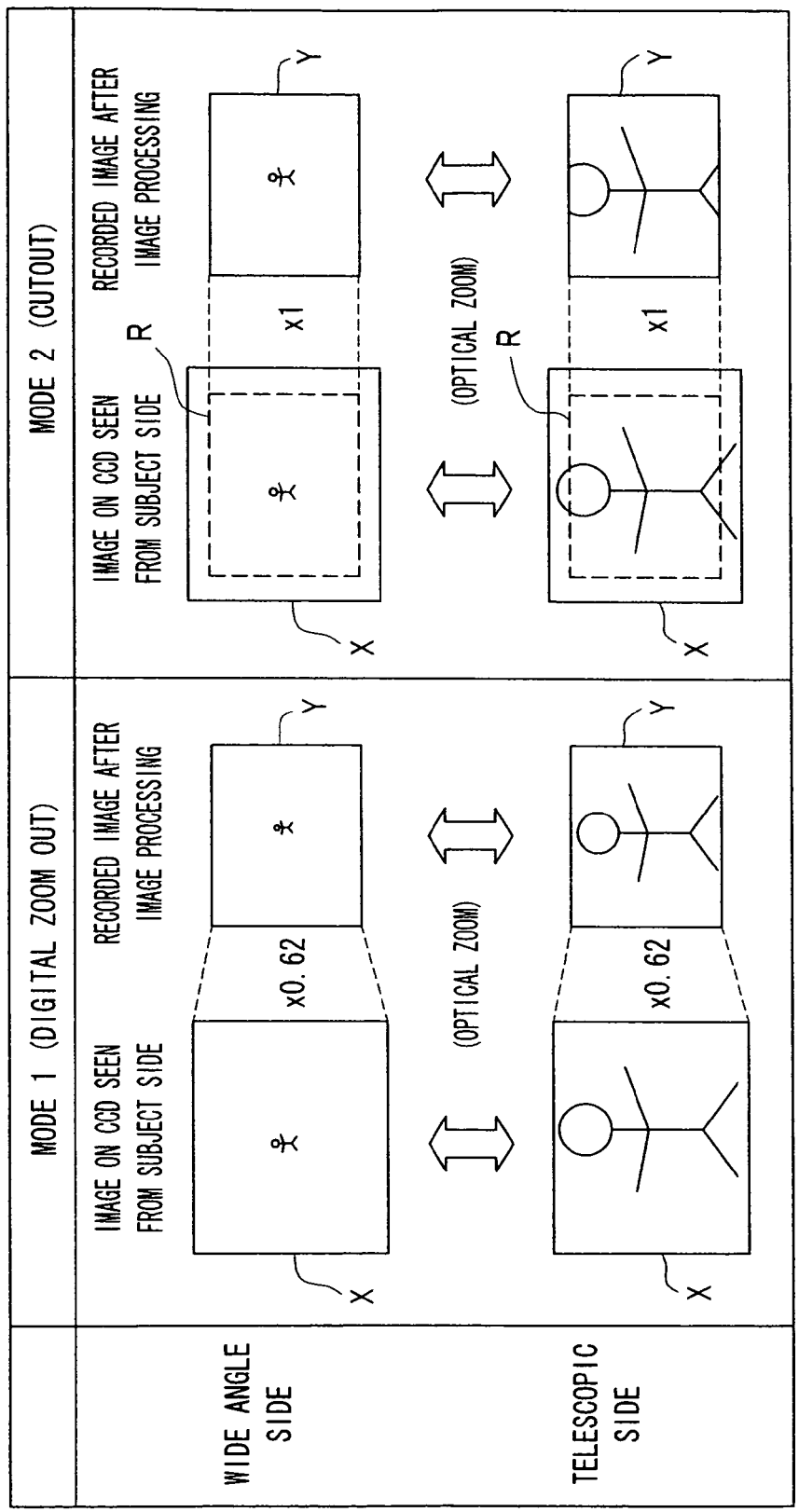
FIG. 14A is a diagram explaining two imaging modes of the imaging apparatus in the sixth embodiment.

The zoom action of the imaging apparatus 10b having the above structure will be described below. The imaging apparatus 10b of the sixth embodiment has two imaging modes (modes 1 and 2) for the zoom, and the two modes can be changed by a mode select switch 25b. The two modes will be described with reference to FIG. 14A.

<Mode 1>

The whole of image X on the CCD 13 is reduced at a predetermined pixel-number conversion rate to generate the recorded image Y. The predetermined pixel-number conversion rate is determined based on a ratio of the number of pixels of the CCD 13 and the number of pixels of the recorded image. For example, when the number of pixels of the CCD 13 is eight million while that of the recorded image is three million, the pixel-number conversion rate becomes 0.62. The zoom function is mainly realized by the optical zoom. That is, the size of the image imaged on the CCD 13 is varied by moving the zoom lens 11b in conjunction with the user's operation of the zoom setting ring 25c, realizing the zoom function.

<Mode 2>

Mode 2 is a mode in which only a region R is used. That is, the region R which is a part of the image X on the CCD 13 is cut out. The recorded image Y is generated from the cutout image. In this case, the pixel-number conversion rate becomes 1. The zoom function is realized by varying the size of the image imaged on the CCD 13 by the optical zoom.

In Mode 1, the recorded image is generated using all pixels in the whole region of the CCD 13. On the other hand, in Mode 2, the recorded image is generated using the pixels of the region R which is a part of the pixels on the CCD 13 and includes the central portion of the CCD 13. Thus, Mode 1 differs from Mode 2 in the region on the CCD 13 which is used to generate the recorded image. A user can select the two modes with the mode select switch 25b. When the modes are switched with the mode select switch 25b, the controller 41 outputs a control signal to the CCD driver 23 so as to change the size of the region on the CCD 13 which is used to generate the recorded image.

According to the sixth embodiment, the central portion of the CCD 13 is used in Mode 2, and thus the optical zoom region is shifted toward the telescopic side in Mode 2, compared to Mode 1, as shown in FIG. 14B. The further wide angle image can be shot by switching the mode from Mode 2 to Mode 1 at the end of the wide angle side in Mode 2.

Seventh Embodiment

Figure 15:
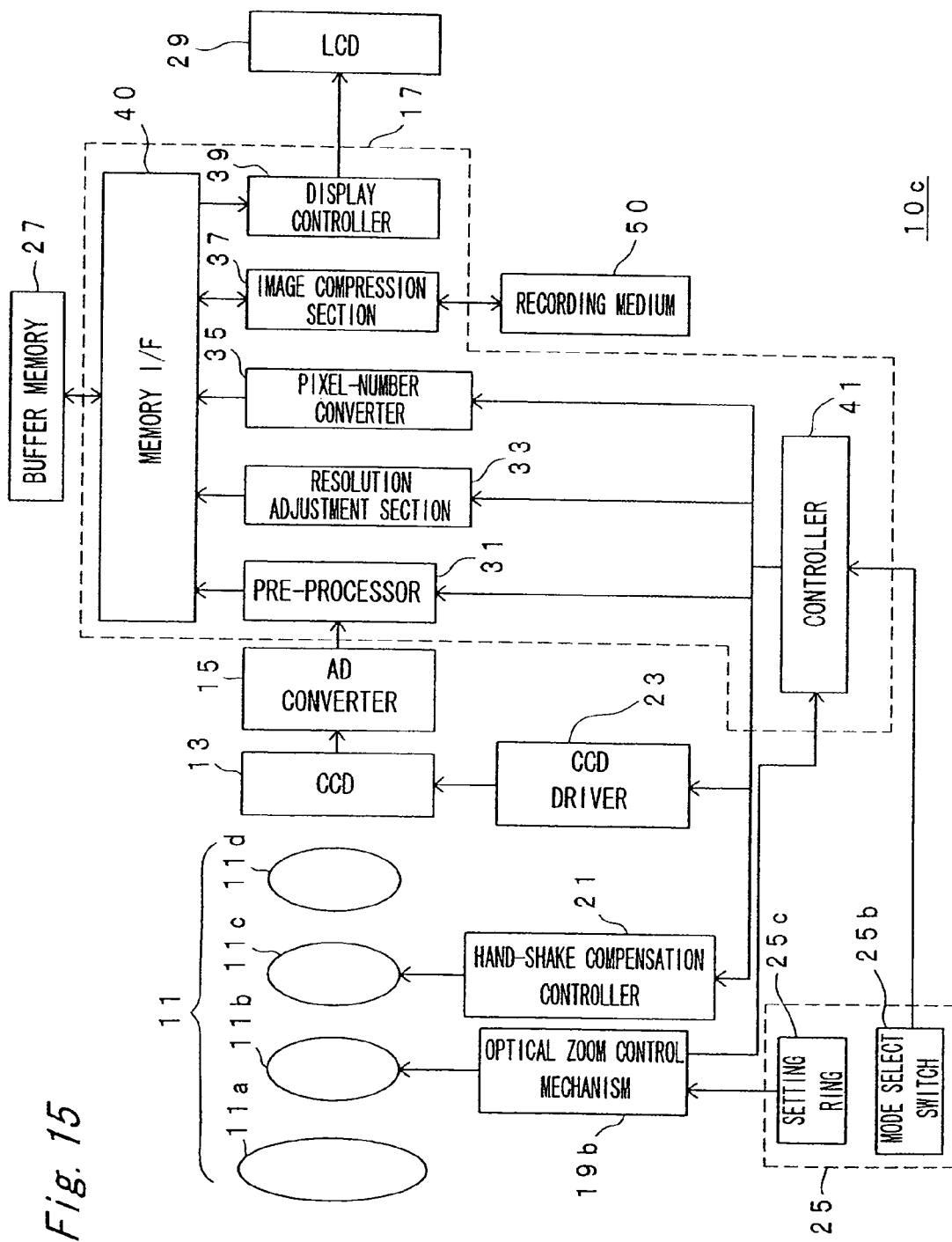
FIG. 15 is a diagram showing a configuration of an imaging apparatus in a seventh embodiment.

FIG. 15 shows still another configuration of an imaging apparatus according to the invention. An imaging apparatus of the present embodiment has the same configuration of the imaging apparatus 10b shown in FIG. 13, and further outputs positional information on the zoom lens 11b from the optical zoom control mechanism 19b to the controller 41.

The zoom action of the imaging apparatus 10c will be described below with reference to FIGS. 16A and 16B. In the present embodiment, both the electronic zoom and the optical zoom are actuated at the wide angle side, and only the optical zoom is actuated at the other position.

Specifically, the position of the zoom lens 11b is determined. The electronic zoom is stopped when the position of the zoom lens 11b is determined to be more than a predetermined value (P2), while the electronic zoom is actuated when the position of the zoom lens 11b is determined not to be more than the predetermined value (P2).

More specifically, the electronic zoom is actuated when the optical zoom magnification is in a range from 1 to 2. The size of the region R is linearly changed in conjunction with the optical zoom magnification as follows. The whole region of the CCD 13 is used when the optical zoom magnification is 1, while the used region R becomes minimum when the optical zoom magnification is 2.

According to the present embodiment too, over a wide range of the variable range of the optical zoom magnification, the imaging can be performed using the central portion of the CCD 13, so that image quality degradation caused by the performance degradation at the lens peripheral portion can be prevented.

In the present embodiment, the electronic zoom can automatically be switched between the actuation and the stop, using the imaging apparatus of which zoom magnification can be set by the setting ring mounted to the lens barrel.

INDUSTRIAL APPLICATION

The invention can be applied to the imaging apparatus such as a digital still camera having zoom functions of both electronic zoom and optical zoom.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-208601 filed on Jul. 19, 2005, which is expressly incorporated herein by reference in its entirety.

What is claimed is:

1. An imaging apparatus comprising:
    an optical system operable to collect optical information from a subject;
    an imaging device operable to convert the optical information from the optical system into an electric signal to generate image data;
    an optical zoom section operable to move the optical system to enlarge and/or reduce an image imaged on the imaging device;
    an electronic zoom section operable to electronically enlarge and/or reduce the image data generated by the imaging device; and
    a controller operable to control the optical zoom section and the electronic zoom section,
    wherein, in an imaging mode in which the image generated by the imaging device is recorded with the number of pixels lower than that of the imaging device, the controller controls the zoom sections so as to actuate only the electronic zoom section when a total zoom magnification is not more than a predetermined value and to actuate only the optical zoom section when the total zoom magnification is more than the predetermined value.

2. The imaging apparatus according to claim 1, wherein the controller controls the electronic zoom section to stop when the total zoom magnification is more than the predetermined value.

3. The imaging apparatus according to claim 1, wherein the controller controls the electronic zoom section so as not to use magnification of the electronic zoom section in a predetermined range in the vicinity of 1.

* * * * *